June 12, 1962  F. ATZBERGER  3,038,356
APPARATUS FOR REFINISHING BRAKE DRUMS
Filed Aug. 26, 1959
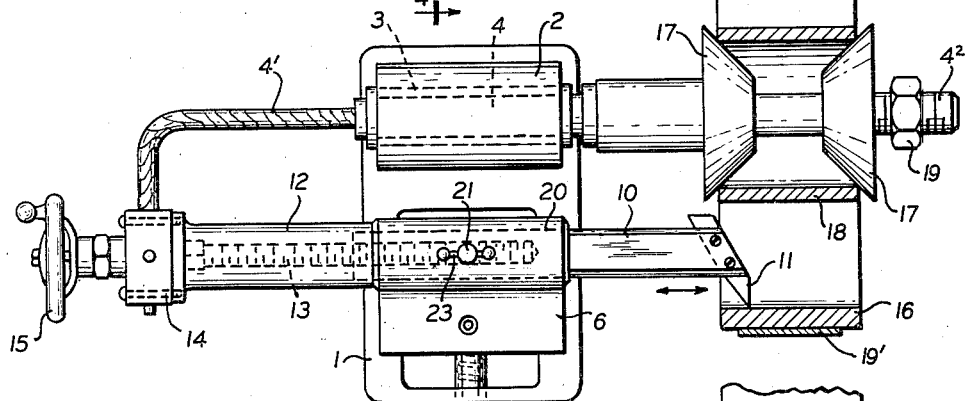
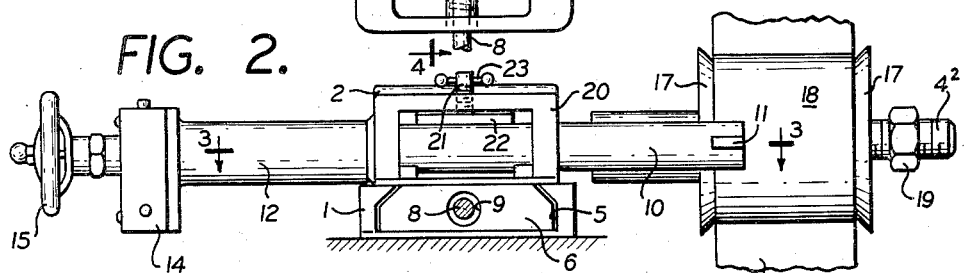
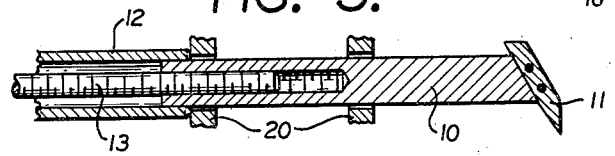
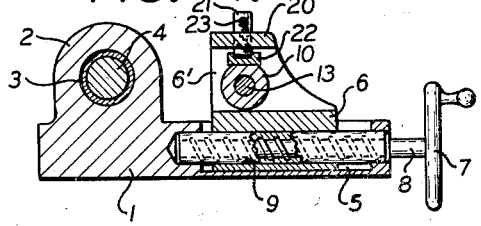
INVENTOR
FRANK ATZBERGER
BY
ATTORNEY

United States Patent Office 3,038,356
Patented June 12, 1962

3,038,356
APPARATUS FOR REFINISHING BRAKE
DRUMS
Frank Atzberger, 160—14 Normal Road, Jamaica, N.Y.
Filed Aug. 26, 1959, Ser. No. 836,093
2 Claims. (Cl. 77—2)

The present invention relates to an apparatus for refinishing brake drums.

It has been recognized before that the braking surface of brake drums is subjected to wear and that from time to time the finish of the braking surface must be improved, whereby the operating characteristics in braking efficiency of a refinished brake drum will compare favorably with the operating characteristics and braking efficiency of the drum when new.

It is undoubtedly of importance that the refinishing of the braking surface of brake drums must be performed in such a manner that the lining is not consumed in order to bring about a polishing of the braking surface of the brake drums.

The smoothness of the finish of the braking surface of the brake drums is of extreme importance and cannot be too strongly emphasized, since it determines not only the overall efficiency of the braking system, but determines the useful life of the brake linings.

The refinishing of brake drums is customarily done by mounting the same to the chuck of a lathe or similar turning device for rotation about its axis of rotation. The worn surface to be refinished is then subjected to the successive cutting operations of a roughing tool and a finishing tool suitably secured to and carried by a turret-head which is secured to and carried by the forward inclined face of a shank. The latter is suitably secured to and carried by a slide rest or the like, by which the tool is held and traversed.

Since lathes are available only in special shops and the brake drums had to be taken to such shops in order to be subjected to a refinishing process, the refinishing of brake drums was a comparatively expensive procedure.

It is, therefore, one object of the present invention to provide an apparatus for refinishing brake drums, which is of extremely simple construction and may be used in any gas station or the like, without requiring a particular lathe.

It is another object of the present invention to provide an apparatus for refinishing brake drums, wherein the brake drum is mounted on a shaft and operating like a belt pulley to be driven by a belt from a motor, which shaft is connected by means of a flexible shaft to a reduction gear which provides the proper speed for advancing the tool-bit along the brake surface of the brake drum during the refinishing process, the tool-bit being mounted on an axially movable rod.

It is yet another object of the present invention to provide an apparatus for refinishing brake drums, which comprises a base supporting the shaft for the brake drum, as well as the feeding means for the tool-bit for advancing the latter along the brake surface.

With these and other objects in view, which will become apparent in the following detailed description, the present invention will be clearly understood in connection with the accompanying drawings, in which:

FIGURE 1 is a top plan view of the apparatus for refinishing brake drums;

FIG. 2 is a front elevation of said apparatus;

FIG. 3 is a section along the lines 3—3 of FIG. 2; and

FIG. 4 is a section along the lines 4—4 of FIG. 1.

Referring now to the drawings, the apparatus for refinishing brake drums comprises a base 1 which forms at its rear end a raised portion 2 in order to provide a bearing 3 for a shaft 4 which projects laterally from the base 1 on one side thereof, and which shaft 4 extends on the opposite end of the bearing 3 into a flexible shaft 4' for a purpose to be set forth below. The front portion of the base 1 forms ways 5 which receive a slide member 6, which slide member 6 may be moved in the ways 5 in longitudinal direction of the base into a plurality of positons, the latter movement being brought about by means of a crank 7 mounted on one end of a threaded shaft 8 which is rotatably mounted in the base 1 without permitting axial movement of the threaded shaft 8. The slide member 6 carries complementary inner thread in a bore 9, so that upon rotation of the crank 7, the slide member 6 will be moved forwardly or rearwardly, depending upon the direction of rotation of the crank 7.

The slide member 6 forms in its upper portion a recess 6' to receive a laterally extending rod 10 which carries at its forward end a tool-bit 11 and which is axially movable within the recess of said slide member 6. As shown in FIG. 3, the rod 10 is axially movable within a sleeve 12 and fed in axial direction by means of a screw bolt 13 turned at predetermined speeds by means of a reduction gear 14. A crank 15 is provided at the extreme end of the reduction gear 14, which crank 15 permits in conventional manner manual adjustment of the tool-bit 11 for setting the latter into starting position of the refinishing process. The reduction gear 14 is connected by means of the flexible shaft 4' with the rear end of the shaft 4 and is thus driven simultaneously with the rotation of the shaft 4 and the brake drum 16, respectively.

The joint rotation of the brake drum 16 with the shaft 4 is brought about by mounting of cones 17 opposite each other on the shaft 4 in such a manner that they engage the hub 18 of the brake drum 16. The cones 17 are retained in position by means of a nut 19 which is secured to the threaded end 4² of the shaft 4 and engages the outer face of one of the cones 17.

The turning of the brake drum 16 is brought about by means of a belt 19' which runs over the outer face of the brake drum 16, the latter operating as a belt pulley, as indicated in FIG. 1. The belt 19' runs over over a second pulley mounted on a motor shaft (not shown).

The slide member 6 forms an upwardly extending bridge portion 20 which receives a tension screw bolt 21 in a complementary threaded bore thereof and carries at its free end a friction plate 22 which engages the rod 10 to retain the same in any one of a plurality of adjusted positions. The screw bolt 21 is turnable by means of arms 23 extending radially therefrom, or by means of a crank (not shown).

The apparatus for refinishing the brake surface of the brake drums designed in accordance with the present invention operates in the following manner:

A brake drum 16 is mounted on the shaft 4 by means of cones 17 and secured in position by means of a nut 19. The slide member 6 which carries the tool-bit 11 is then moved radially in the brake drum 16 until the point of the tool-bit 11 engages the brake surface of the brake drum 16. Upon operation of the crank 15 operatively connected with the screw bolt 13, the tool-bit 11 is moved to a point adjacent one of the end faces of the brake drum 16. Then the belt 19' is mounted on the brake drum 16, thereby, connecting the motor drive to the brake drum 16 and upon starting the motor (not shown) the brake drum 16 will start its rotation. By this arrangement, the shaft 4 joins the rotation of the brake drum 16 and transfers this movement to the flexible shaft 4' which feeds into the reduction gear 14 and in turn the tool-bit 11 is moved in axial direction along the brake surface of the brake drum 16 during rotation of the latter. The slide member 6 permits movement of the rod 10 and, thereby, of the tool-bit 11 in radial direction within the brake drum 16, so that easy accommodation can be obtained to the respective diameters of different brake drums. If the tool-bit 11 is properly set, the friction plate 22 is tightened toward the rod 10 so as to retain the tool-bit 11 at a desired distance from the center of the brake drum 16, in accordance with the particular inner radius of the latter. The rod 10 has a flat surface opposite the friction plate 22, which arrangement permits axial movement of the rod 10 without rotation thereof.

While I have disclosed one embodiment of the present invention, it is to be understood that this embodiment is given by example only and not in a limiting sense, the scope of the present invention being determined by the objects and the claims.

I claim:

1. An apparatus for refinishing brake drums as a work piece, comprising a base including a bearing, a shaft rotatably mounted in said bearing, a brake drum secured to said shaft for common rotation with the latter, driving means for said brake drum including a belt surrounding said brake drum for driving the latter and, thereby, said shaft by means of said belt, said brake drum constituting an element of said driving means as well as said work piece, a slide member movable in said base in a direction perpendicularly to the longitudinal axis of said shaft, a rod mounted in said slide member for axial movement and carrying at one end a tool-bit, the latter engaging the brake surface of said brake drum, means to feed said rod axially including a flexible shaft and a reduction gear, said flexible shaft being operatively connected at one end with said first-mentioned shaft, the other end of said rod being operatively connected with said reduction gear, the latter being also operatively connected with the other end of said flexible shaft, and said tool-bit moving jointly with said rod in axial direction of the latter along the brake surface during the rotation of said brake drum.

2. The apparatus, as set forth in claim 1, which includes a threaded shaft rotatably, but axially immovably mounted in said base, a threaded bore complementary to said threaded shaft in said slide member, the latter moving upon rotation of said threaded shaft in a direction perpendicularly to the longitudinal axis of said first mentioned shaft, in order to put said tool-bit into any one of a plurality of positions spaced apart from the axis of said first mentioned shaft.

References Cited in the file of this patent

UNITED STATES PATENTS

| | | |
|---|---|---|
| 1,554,302 | Slyder | Sept. 22, 1925 |
| 1,708,405 | Aff | Apr. 9, 1929 |
| 2,011,940 | Myers | Aug. 20, 1935 |
| 2,878,694 | Stratton et al. | Mar. 24, 1959 |